United States Patent
Yarlagadda

(10) Patent No.: US 11,087,632 B1
(45) Date of Patent: *Aug. 10, 2021

(54) AUTONOMOUS UAV OBSTACLE AVOIDANCE USING MACHINE LEARNING FROM PILOTED UAV FLIGHTS

(71) Applicant: Amazon Technologies, Inc., Seattle, WA (US)

(72) Inventor: Pradeep Krishna Yarlagadda, Redmond, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/884,312

(22) Filed: May 27, 2020

Related U.S. Application Data

(63) Continuation of application No. 15/271,107, filed on Sep. 20, 2016, now Pat. No. 10,679,509.

(51) Int. Cl.
*G08G 5/00* (2006.01)
*H04L 29/08* (2006.01)

(52) U.S. Cl.
CPC ......... *G08G 5/0069* (2013.01); *G08G 5/0039* (2013.01); *H04L 67/12* (2013.01)

(58) Field of Classification Search
CPC ..... G08G 5/0069; G08G 5/0039; H04L 67/12
USPC ............................................................ 701/3
See application file for complete search history.

(56) References Cited

U.S. PATENT DOCUMENTS

| 5,581,250 | A | 12/1996 | Khvilivitzky |
| 5,785,281 | A | 7/1998 | Peter et al. |
| 5,983,161 | A | 11/1999 | Lemelson et al. |
| 9,102,406 | B2* | 8/2015 | Stark ................ G05D 1/0027 |
| 9,671,791 | B1* | 6/2017 | Paczan ................ G08G 5/045 |

(Continued)

OTHER PUBLICATIONS

Office Action for U.S. Appl. No. 15/271,107, dated Oct. 18, 2019, Yarlagadda, "Autonomous UAV Obstacle Avoidance Using Machine Learning From Piloted UAV Flights", 9 pages.

(Continued)

*Primary Examiner* — Jonathan M Dager
*Assistant Examiner* — Jean W Charleston
(74) *Attorney, Agent, or Firm* — Lee & Hayes, P.C.

(57) ABSTRACT

A machine learning engine may correlate characteristics of obstacles identified during remotely piloted UAV flights with manual course deviations performed for obstacle avoidance. An obstacle detection application may access computer vision footage to determine notable characteristics (e.g. a direction of travel and/or velocity) of obstacles identified during the piloted UAV flights. A deviation characteristics application may access flight path information identify course deviations performed by a pilot in response to the obstacles. A machine learning engine may use the obstacle characteristic data and the deviation characteristics data as training data to generate an optimal course deviation model to use by an autopilot module to autonomously avoid obstacles during autonomous UAV flights. In creating the optimal deviation model, the training data may be processed by the machine learning engine to identify correlations between certain types of manual course deviations performed to avoid certain types of obstacles.

20 Claims, 7 Drawing Sheets

(56) References Cited

U.S. PATENT DOCUMENTS

| | | | |
|---|---|---|---|
| 2007/0106473 A1* | 5/2007 | Bodin | G08G 5/0069 |
| | | | 701/301 |
| 2009/0210109 A1* | 8/2009 | Ravenscroft | G01C 21/20 |
| | | | 701/26 |
| 2015/0269860 A1* | 9/2015 | Shaw | G09B 9/08 |
| | | | 434/35 |
| 2015/0323932 A1* | 11/2015 | Paduano | G05D 1/0676 |
| | | | 701/3 |
| 2016/0068267 A1* | 3/2016 | Liu | G05D 1/0061 |
| | | | 701/11 |
| 2016/0304198 A1* | 10/2016 | Jourdan | G05D 1/0088 |
| 2017/0036771 A1 | 2/2017 | Woodman et al. | |
| 2017/0076616 A1 | 3/2017 | Kanade et al. | |
| 2017/0102241 A1 | 4/2017 | Paduano et al. | |
| 2017/0186329 A1* | 6/2017 | Gao | G08G 5/0034 |
| 2018/0072414 A1* | 3/2018 | Cantrell | B64C 33/02 |

OTHER PUBLICATIONS

Office Action for U.S. Appl. No. 15/271,107, dated Nov. 29, 2018, Yarlagadda, "Autonomous UAV Obstacle Avoidance Using Machine Learning From Piloted UAV Flights", 10 pages.

Office Action for U.S. Appl. No. 15/271,107, dated Apr. 5, 2019, Yarlagadda, "Autonomous UAV Obstacle Avoidance Using Machine Learning From Piloted UAV Flights", 10 pages.

Office action for U.S. Appl. No. 15/271,107, dated May 3, 2018, Yarlagadda, "Autonomous UAV Obstacle Avoidance Using Machine Learning From Piloted UAV Flights", 14 pages.

Office action for U.S. Appl. No. 15/271,107, dated Jun. 27, 2017, Yarlagadda, "Autonomous UAV Obstacle Avoidance Using Machine Learning From Piloted UAV Flights", 13 pages.

* cited by examiner though by a degree to which a

AUTONOMOUS UAV OBSTACLE AVOIDANCE USING MACHINE LEARNING FROM PILOTED UAV FLIGHTS

PRIORITY

This Application is a continuation of, and claims priority to, U.S. patent application Ser. No. 15/271,107, filed on Sep. 20, 2016, entitled "AUTONOMOUS UAV OBSTACLE AVOIDANCE USING MACHINE LEARNING FROM PILOTED UAV FLIGHTS", which is fully incorporated by reference herein.

BACKGROUND

An autopilot system may cause an aircraft to autonomously perform various flight maneuvers or course alterations based on rules defining actions to be taken under various circumstances. Some autopilot systems may be programmed to follow predefined routes defined by waypoints and some autopilot systems are configured to identify and avoid obstacles. With the numerous different ways in which any particular obstacle may be responded to and the ever changing aerial environment in which unmanned aerial vehicles (UAVs) are to operate, it has become impracticable for autopilot systems to be manually programed to consider all those factors that pilots consider (consciously or subconsciously) in deciding upon an optimal response to an obstacle. In particular, although traditional autopilot systems may perform rudimentary obstacle avoidance techniques, such systems lack the ability to model a pilot's ability to intuitively adapt to various conditions and must be continually updated with new functionality.

Although continually updating autopilot systems to efficiently respond to new conditions is generally a desirable goal, such a process is inherently reactionary and labor intensive in nature. Moreover, such procedures are unable to replicate the effect of pilots' intuition or culmination of flying experience on choosing how to maneuver around or within proximity to an obstacle.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
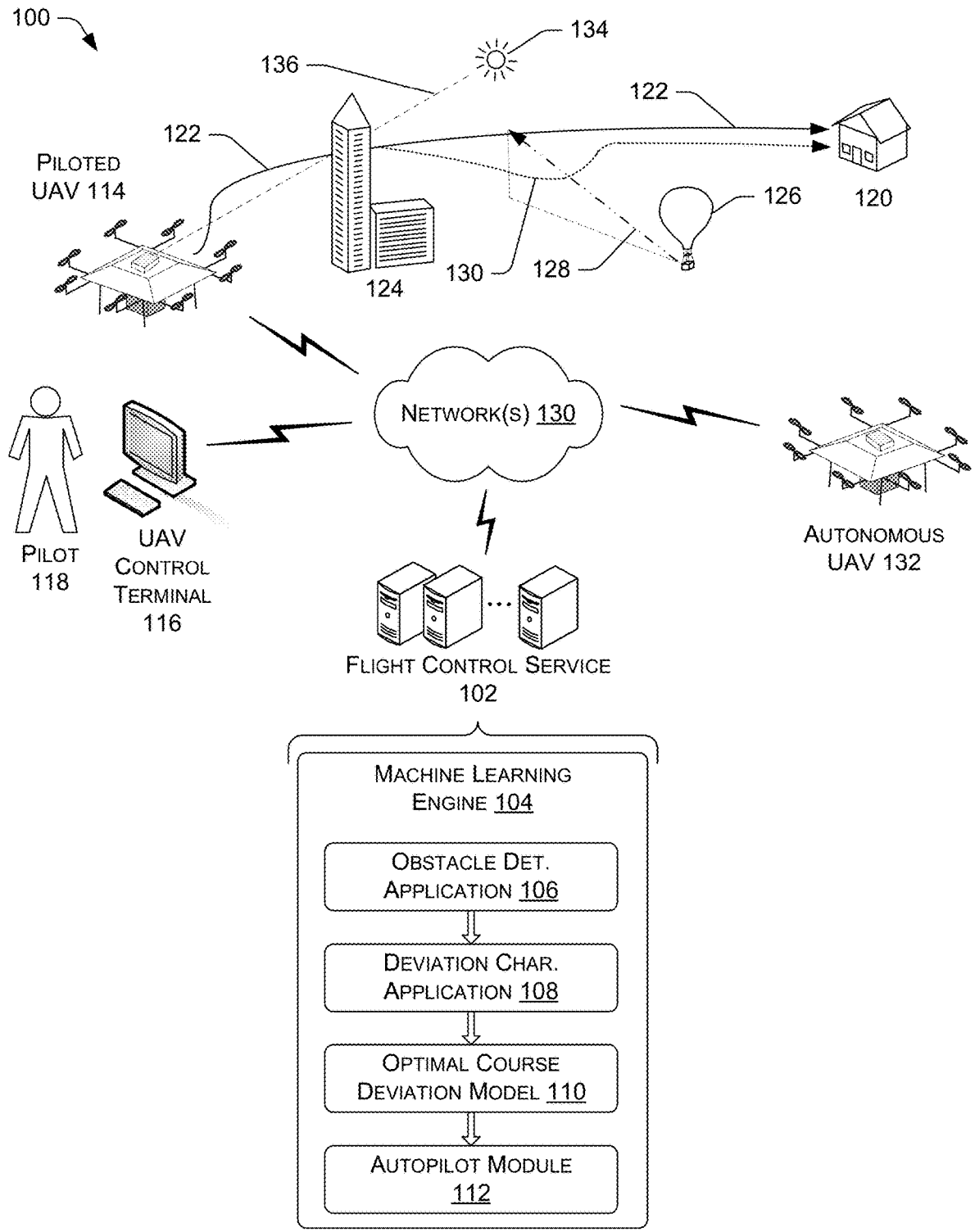
FIG. 1 is a schematic diagram of an illustrative computing environment usable to perform autonomous Unmanned Aerial Vehicle (UAV) obstacle avoidance using machine learning from remotely piloted UAV flights.

This disclosure is directed to using a machine learning engine to correlate characteristics of unanticipated obstacles that are identified during remotely piloted unmanned aerial vehicle (UAV) flights (hereinafter "piloted UAV flights") with characteristics of manual course deviations undertaken by pilots for avoidance of the unanticipated obstacles. An obstacle detection application may access computer vision footage corresponding to the piloted UAV flights to identify obstacles and also to generate obstacle characteristics data by determining notable characteristics such as, for example, a direction of travel and/or velocity of a number of obstacles identified during the piloted UAV flights. A deviation characteristics application may access flight path information corresponding to the piloted UAV flights to identify manual course deviations, e.g. course deviations that are performed by a pilot remotely via a UAV control terminal, and also to generate deviation characteristics data by identifying characteristics of the manual course deviations. Exemplary manual course deviation characteristics include deviation types, e.g. turns or climbs, and also deviation costs, UAV stability effects and resources consumed. The obstacle characteristic data and/or the deviation characteristics data may be used as training data to create an optimal course deviation model usable to avoid obstacles during autonomous UAV flights. In particular, the machine learning engine may process the obstacle characteristic data and the deviation characteristics data to create an optimal deviation model to calculate optimal course deviations for performance by autonomous UAVs to avoid obstacles that are identified during autonomous UAV flights.

In creating the optimal deviation model, the obstacle characteristic data and the deviation characteristics data may be processed by the machine learning engine to identify data instances, referred to herein as "indicators," that have a strong correlation with an identified manual course deviation having certain characteristics (e.g. an abrupt change in or reversal of course) being performed to avoid an obstacle having certain characteristics (e.g. a fast moving obstacle in close proximity). As described in more detail below, the indicators may include a mobility of the obstacle, a relative direction of the obstacle, a velocity of the obstacle, a distance between the obstacle and the piloted UAVs, an erratic nature of the obstacle, a shape of the obstacle, and/or obstacle flight data. In some embodiments, the machine learning engine may analyze the obstacle characteristic data to identify relationships between a distance from a UAV to an obstacle and/or an obstacle speed to a degree to which a course deviation is performed during the piloted UAV flights. For example, pilots may tend to make slight or no manual course deviations in response to a slow moving and distant obstacle (e.g. a blimp several miles away) but may tend to abruptly change course in response to identifying a fast obstacle in close proximity (e.g. an unidentified UAV within several hundred feet). Accordingly, the optimal deviation model may be deployed to analyze computer vision footage (e.g. stereo vision footage that is captured by one or more stereo camera units of the UAVs) of an autonomous UAV and to then vary a degree of autonomously performed course deviations based on corresponding degrees to which pilots perform such deviations responsive to similar obstacle conditions. In some embodiments, the optimal deviation model is based on a plurality of manual course deviations performed during the piloted UAV flights in response to unanticipated obstacles under live conditions, e.g. while the piloted UAV is delivering cargo to a destination. In some embodiments, the optimal deviation model is based on a plurality of manual course deviations performed in response to quasi-unanticipated obstacles under simulated and/or training conditions. For example, the piloted UAV may be flown in a controlled environment in which one or more obstacles must be avoided or otherwise dealt with to successfully complete a mission. In some embodiments, the optimal deviation model is based on a regression model of the plurality of manual course deviations performed during the piloted UAV flights.

In various embodiments, the machine learning engine may determine weights for individual indicators. The weights may calibrate or apportion the influence of the respective individual indicators in the optimal deviation model. For example, in selecting a degree to deviate from a course, an erratic nature of an obstacle may be weighted more heavily than a speed and/or proximity of the obstacle. In particular, pilots may be less inclined to deviate from a course in response to a commercial airplane in straight and level flight than in response to an erratically flying recreational UAV despite recreational UAV being slower and farther away than the commercial airplane. In some embodiments, one or more weighing factors may apportion negative influence such that the presence of corresponding indicators reduces the likelihood and/or degree of course deviations. For example, even in the absence of observed erratic behavior, a shape of the obstacle may indicate a high likelihood of the obstacle behaving predictably such that pilots tend to make minimal course deviations. As a specific example, UAV pilots may recognize that commercial airliners ascending in controlled airspace will not deviate from their course (absent an emergency situation) and, therefore, may maintain a UAV course passing under the airliner's climb path. The optimal deviation model may be updated over time by the machine learning engine as data correlations evolve over time, e.g. as pilot behavior changes responsive to evolving regulations and/or best practices.

In some embodiments, the machine learning engine may access sensor data corresponding to the manual course deviations to determine a stability of the UAVs during the maneuvers. For example, accelerometer data may indicate that turning the UAV above a certain rate causes the UAV to slip downward to the side rather than maintaining level fight. In some embodiments, the machine learning engine classifies the plurality of manual course deviations as either stable or unstable. In some embodiments, the machine learning engine may assign the plurality of manual course deviations a stability score indicative of a degree to which the UAV remained stable during the manual course deviations. Accordingly, the optimal deviation model be based on the stability of previous piloted UAV flights to avoid unstable conditions during autonomous UAV flights.

The techniques and systems described herein may be implemented in a number of ways. Example implementations are provided below with reference to the following figures.

FIG. 1 is a schematic diagram of an illustrative computing environment 100 usable to perform autonomous Unmanned Aerial Vehicle (UAV) obstacle avoidance using machine learning from piloted UAV flights. The environment 100 includes a flight control service 102. The flight control service 102 may enable manual or at least partially manual control of a piloted UAV 114. For example, the flight control service 102 may be communicatively coupled to both of the piloted UAV 114 and a UAV control terminal 116 and to enable display of a substantially live video stream of a path of the piloted UAV 114. While monitoring the video stream, a pilot 118 may identify obstacles and perform one or more manual course deviations to avoid the obstacles. For example, while piloting the UAV 114 toward a destination 120, the pilot 118 may be causing the piloted UAV 114 to follow a course 122 (shown in FIG. 1 as a solid line) around one or more stationary obstacles such as a building cluster 124. The pilot 118 may then identify an unanticipated obstacle 126 and, based on a trajectory 128 of the unanticipated obstacle 126, the pilot 118 may perform a manual course deviation 130 (shown in FIG. 1 as a dashed line) to ensure avoidance of the obstacle 126. In particular, the pilot 118 may recognize that the obstacle 126 is climbing into the course 122 and may respond by deviating from the course 122 by dipping under the trajectory 128 and then climbing partially back up toward the course 122 to travel the rest of the way to the destination 120. The flight control service 102 may also enable autonomous control of an autonomous UAV 132. For example, the flight control service 102 may provide autopilot capabilities to the autonomous UAV 132.

The flight control service 102 includes a machine learning engine 104 to create and/or deploy one or more of an obstacle detection application 106, a deviation characteristics application 108, an optimal deviation model 110, and an autopilot module 112. In some embodiments, the autopilot module 112 is configured to autonomously control the UAV with little or no input from a pilot and/or any external controlling entity. For example, the autopilot module 112 may be loaded into a computing system of an autonomous UAV and may control the autonomous UAV without input from a pilot and/or the flight control service 102. In some embodiments, the optimal deviation model 110 may be created by employing supervised learning wherein human experts assists in generating labeled training data. For example, a human expert such as a pilot, an engineer, a flight coordinator, or other type of human reviewer may identify and/or classify manual course deviations in flight path information of past piloted UAV flights to be used as training data for the machine learning engine 104 to extract correlations from. Other machine learning techniques may also be utilized, such as unsupervised learning, semi-supervised learning, classification analysis, regression analysis, clustering, etc. One or more predictive models may also be utilized, such as a group method of data handling, Naïve Bayes, k-nearest neighbor algorithm, majority classifier, support vector machines, random forests, boosted trees, Classification and Regression Trees (CART), neural networks, ordinary least square, and so on.

The flight control service 102 may receive computer vision footage taken during a large number of piloted UAV flights and that includes footage of one or more obstacles. The obstacle detection application 106 may analyze the computer vision footage to identify the obstacles and associated characteristics thereof such as, for example, to generate obstacle characteristic data. For example, the obstacle detection application 106 may identify an obstacle and then determine whether the obstacle is fixed in space (e.g. a building or a house) or mobile (e.g. an airplane). Exemplary computer vision technologies for use with the systems and methods described herein include, but are not limited to, stereo vision, LIDAR, RADAR, Time-of-Flight for Light, and any other computer vision technologies whether now existing or subsequently developed. In some embodiments, the obstacle detection application 106 may identify a mobile obstacle such as obstacle 126 and determine a direction that the obstacle is traveling relative to the course 122. For example, the obstacle detection application 106 may determine the trajectory 128 and whether the trajectory 128 is projected to come within a threshold distance to the piloted UAV 114 if it continues to travel along the course 122. In some embodiments, the obstacle detection application 106 may determine a velocity of the obstacle 126, a shape of the obstacle 126, and/or any other type of characteristic discernable from the computer vision footage taken during the piloted UAV flights.

The flight control service 102 may also receive flight path information corresponding to the piloted UAV flights that include course deviations of varying degrees in response to unanticipated obstacles of varying types and/or characteristics. The deviation characteristics application 108 may analyze the flight path information to identify notable characteristics of pilot performed course deviations. For example, the flight path data may reveal that slight course deviations are appropriate to avoid stationary obstacles such as the building cluster 124 while larger deviations are appropriate to avoid mobile obstacles such as the hot air balloon 126. Exemplary course deviations may include turning to the right or left of the course 122, ascending or descending from the course 122, and/or changing a velocity of the UAV along the course. In some embodiments, the flight path information may include a plurality of geographical coordinates defining the actual paths of the piloted UAV flights. For example, the flight path information may be comprised of a plurality of GPS data points defining a path traveled and, for individual ones of the GPS data points, a corresponding time and/or altitude of the UAV when at the points. In some embodiments, the flight path information may also include sensor data indicating various parameters of the UAV along the path. For example, the flight path data may include accelerometer data corresponding to the UAV along the recorded flight path and associated with various manually performed flight maneuvers. The sensor data may also include environmental data such as, for example, temperature and/or barometric pressure associated with the piloted UAV flights. In some embodiments, the deviation characteristics application 108 may use temperature and pressure data to calculate air density data associated with the piloted UAV flights to use correlating increased/decreased performance capabilities of the piloted UAVs with variations in air density.

The flight control service 102 may deploy the machine learning engine 104 to process, as training data, the obstacle characteristic data and the deviation characteristics data to identify indicators that have a strong correlation with course deviations of a particular type and degree being performed to avoid an obstacle of a particular type and degree. For example, a large number of piloted UAV flights may include abrupt deceleration maneuvers within a few seconds of a recreational UAV entering the piloted UAV's field of view (FOV) (e.g. a FOV of a stereo vision unit) at a close proximity. Accordingly, the relative proximity of a recreational UAV may be an indicator that it is appropriate to decelerate from cruising speed until having passed by a zone associated with the recreational UAV. Furthermore, the relative proximity of the recreational UAV may be related to the amount of deceleration that is appropriate. For example, in instances when a recreational UAV is identified at a very close proximity to the piloted UAV 114 then the corresponding manual course deviations may include full stops or even course reversals to re-gain distance from the recreational UAV.

Based on the identified indicators, the machine learning engine 104 may create an optimal course deviation model 110. In some embodiments, the optimal course deviation model 110 is based on a regression function that uses occurrences of individual indicators to calculate optimal course deviations. For example, an optimal course deviation for responding to an identified obstacle may be calculated as a regression fit (e.g. a linear regression or polynomial regression) to a plurality of GPS data points associated with manual course deviations corresponding to similar obstacles. Furthermore, the optimal course deviation model 110 may be based on corresponding degrees of a characteristic of the similar obstacles to account for a corresponding degree of the characteristic in relation to the newly identified obstacle. For example, course deviations to travel around fast and erratically moving obstacles may be generally larger than course deviations to travel around a stationary and/or slow and predictably moving obstacle.

The flight control service 102 may deploy the optimal course deviation model 110 in an autopilot module 112 that is used to instruct the autonomous UAV 132. The autopilot module 112 may monitor a substantially live stream of computer vision footage (e.g. footage capture by a stereo camera unit) during an autonomous UAV flight to identify new occurrences of the individual indicators in association with a new obstacle. For example, the autopilot module 112 may deploy computer vision capabilities of the autonomous UAV to identify obstacles such as the building cluster 124 and the hot air balloon 126 and may further analyze the obstacles to identify associated indicators. For example, the autopilot module 112 may recognize that the size and shape of the buildings of the building cluster 124 is an indicator of these obstacles being stationary. The autopilot module 112 may also recognize that hot air balloon 126 is moving and may analyze the movement to determine a trajectory and/or velocity thereof. Based on indicators identified with respect to various obstacles, the autopilot module 112 may use the optimal course deviation model 110 to calculate optimal course deviations for avoiding the various obstacles. Then, the autopilot module 112 may cause the autonomous UAV to perform the course deviations.

Although the concepts described herein are primarily discussed in relation to physical obstacles such as, for example, the building cluster 124 and the hot air balloon 126, the concepts described herein are applicable to non-physical obstacles as well. For example, intense light sources 134 (e.g. the sun or reflections thereof) which may produce rays of light 136 that capable of disrupting computer vision capabilities of piloted and/or autonomous UAVs. In some embodiments, the manual course deviations performed during the piloted UAV flights may be intended to mitigate the occurrences of lens flare and the new course deviations performed during the autonomous UAV flights, e.g. those caused by the autopilot module 112, may also be intended to mitigate the occurrences of lens flare.

The flight control service 102 may exchange data with user devices, such as the UAV control terminal 116, piloted UAVs 114, autonomous UAVs 132, and/or any other entities described herein via one or more networks 130. The networks may be wired or wireless networks that facilitate exchange of data, request, and/or other information or signals.

Figure 2A:
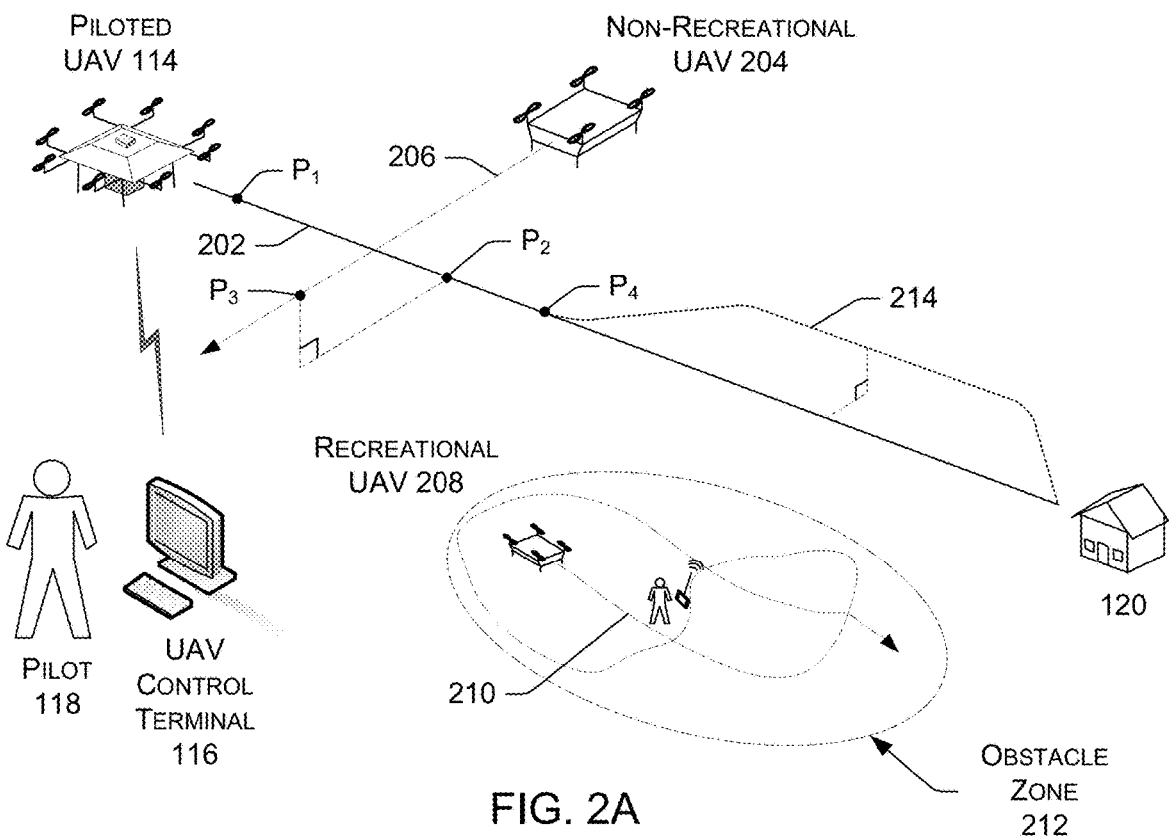
FIG. 2A is a schematic diagram of a remotely piloted UAV being manually deviated from a course based on characteristics of unanticipated obstacles that are identified while traveling toward a destination.

FIG. 2A is a schematic diagram of a piloted UAV 114 being manually deviated from a course 204 based on characteristics of unanticipated obstacles that are identified while traveling toward a destination 120. In some embodiments, the piloted UAV 114 is obedient to flight commands that are remotely entered by a human pilot 118 via a UAV control terminal 116. For example, the pilot 118 may be monitoring a substantially live video stream captured by cameras (e.g. a stereo camera unit) that are mounted on the piloted UAV 114.

At a first point (labeled and herein after $P_1$) along the course 202, the pilot 118 may identify a first obstacle such as a non-recreational UAV 204. The pilot 118 may infer that the non-recreational UAV 204 is non-recreational in nature based on visual cues such as visible data collection equipment and/or a cargo load affixed to the non-recreational UAV 204. The pilot 118 may also recognize that the non-recreational UAV 204 is travelling along a straight and level course 206. Based on the visual cues identified (consciously or subconsciously) by the pilot 118, the pilot 118 may determine that no course deviation is necessary to avoid the non-recreational UAV 204. For example, the pilot 118 may estimate that based on the speed and course of the non-recreational UAV 204 the UAV 204 will have passed over the course 202 prior to the piloted UAV 114 nearing the course 206. In particular, the pilot 118 may estimate that by the time that the piloted UAV reaches the closed point on the course 202 to the course 206 (labeled and hereinafter $P_2$) that the obstacle will already have reached $P_3$, i.e. the UAV 204 will have already passed over the course 202 such that a course deviation is unnecessary. In analyzing the training data, the machine learning engine 104 may recognize that UAVs having certain visual characteristics, e.g. visible sensor equipment and/or governmental agency markings, and/or traveling along a relatively straight trajectory have a low tendency of triggering pilots to alter course. Accordingly, such visual characteristics and/or determined straight trajectories in association with obstacles identified by the autopilot module 112 during autonomous UAV flights may be indicators that a relatively slight or even no course deviation is appropriate.

A later point (labeled and herein after $P_4$) along the course 202, the pilot 118 may identify a second obstacle such as a recreational UAV 208. The pilot 118 may infer that the recreational UAV 208 is recreational in nature based on visual cues such as colorful paint schemes and/or a relatively small size. The pilot 118 may also recognize that the recreational UAV 208 is travelling along an erratic flight path 210. Based on the visual cues, the pilot 118 may determine that a course deviation is necessary to maintain separation from the recreational UAV 208. For example, the pilot 118 may estimate an obstacle zone 212 based on an area within which the recreation UAV 208 is observed to operate. The pilot may then perform a manual course deviation 214 to maintain separation from the UAV 208 and/or the obstacle zone 212. In particular, the pilot 118 may alter the course of the piloted UAV 114 away from the UAV 208 and/or obstacle zone 212 and then, once beyond the UAV 208 and/or zone 212, the pilot 118 may converge back onto the course 202 to arrive at the destination 120. In analyzing the training data, the machine learning engine 104 may recognize that UAVs having certain visual characteristics, e.g. bright flashy paint schemes, and/or traveling along an erratic flight path have a high tendency of triggering pilots to alter course. Accordingly, such visual characteristics and/or erratic movements in association with obstacles identified by the autopilot module 112 during autonomous UAV flights may be indicators that a relatively large and/or abrupt course deviation is appropriate.

Figure 2B:
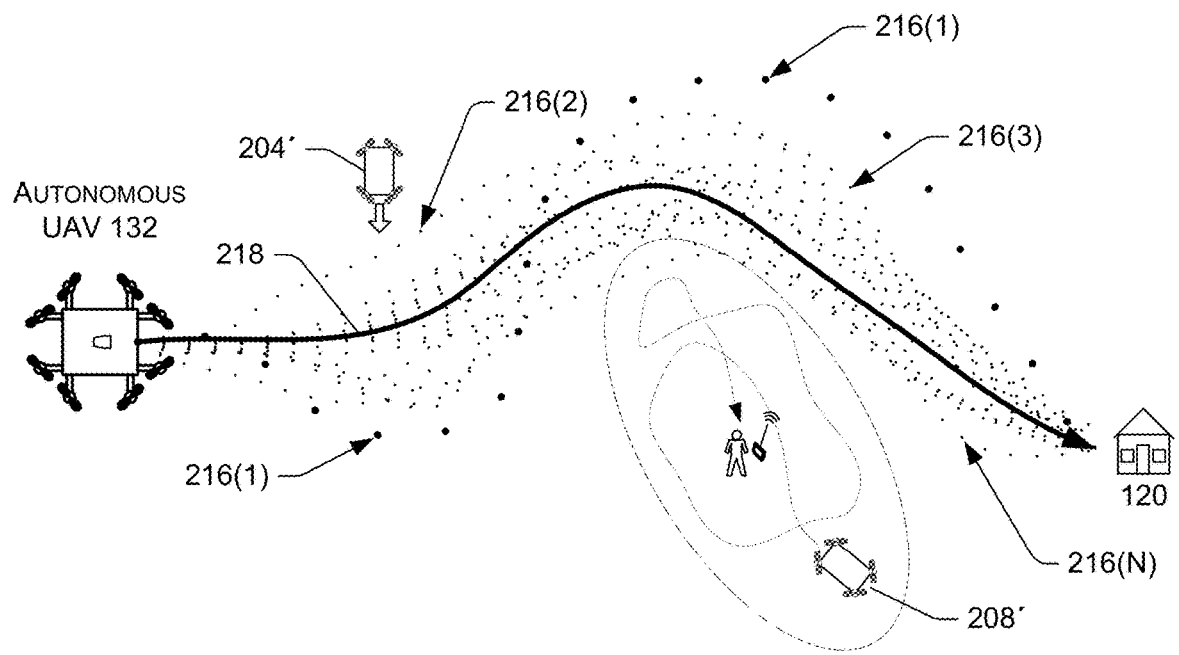
FIG. 2B is a schematic diagram of an autonomous UAV responding to unanticipated obstacles by deviating from a course by performing optimal deviations that are based on one or more regression of a plurality of remotely piloted UAV flight paths.

FIG. 2B is a schematic diagram of an autonomous UAV 132 responding to unanticipated obstacles 204' and 208' by deviating from a course by performing optimal deviations that are based on one or more regression of a plurality of piloted UAV flight paths 216. Obstacles 204' and 208' are labeled with a "prime" symbol to convey that they are similar to and/or share indicators with obstacles 204 and 208. Accordingly, optimal course deviations associated with obstacles 204' and 208' may be based on manual course deviations performed responsive to obstacles 204 and 208, respectively. In some embodiments, individual ones of the flight paths 216 may be represented as a plurality of geographical coordinates defining a path along which a particular UAV is piloted. For example, the flight path information may be comprised of a plurality of GPS data points defining a path traveled and, for individual ones of the GPS data points, a corresponding time and/or altitude of the UAV when at the points. With reference to FIG. 2B, to improve clarity of the superimposed nature of the flight paths 216 individual coordinates for flight path 216(1) are illustrated as larger than the coordinates for the remaining flight paths 216(2)-216(N). It will be appreciated that more flight paths are illustrated than are labeled. Each of the individual flight paths 216 are representative of a corresponding pilot's reaction to various obstacles. For example, the controlling pilot corresponding to flight path 216(1) appears to have a tendency to perform relatively large course deviations in response to various obstacles. In particular, path 216(1) indicates that a piloted UAV 114 was caused to perform large course deviations in response to the obstacles 204 and 208.

Based on the numerous flight paths 216, the autonomous UAV 132 is caused to travel along a course 218 (shown as a bold solid line with terminal arrowhead) that includes deviations modeled after the actual deviations performed by human pilots. In the illustrated embodiment, the actual course 218 of the autonomous UAV is based on a regression of one or more of the flight paths 216. In some embodiments, one or more portions of one or more flight paths 216 may be discarded, e.g. not used in the regression analysis, based on a determination that one or more rules and/or a stability threshold were violated. For example, it may be determined that flight path 216(2) came too close to the UAV 204 during the corresponding piloted UAV flight and, therefore, that at least the portion of this flight path that is near the UAV 204 should be discarded. Accordingly, the optimal course deviation model 110 may be based solely on acceptable ones of the flight paths 216.

In some embodiments, the optimal course deviation model 110 is based on characteristics of the manual course deviations other than and/or in addition to the coordinates. For example, the deviation characteristics application 108 may access flight path information corresponding to the piloted UAV flights to generate deviation characteristics data by identifying characteristics of the manual course deviations such as, for example, a cost of the deviations in terms of time and/or resources consumed. With particular reference to flight path 216(1), it will be appreciated that performing these relatively large course deviations will consume additional on-board energy resources (e.g. fuel and/or battery) and may also increase the overall flight time. Such considerations may be of particular importance under circumstances where (i) the on-board energy resources of the autonomous UAV 132 limit its flight time/range or (ii) the autonomous UAV 132 is required to perform a task within a particular time frame (e.g. delivery cargo with a certain time). Accordingly, the optimal course deviations calculated by the autopilot module 112 may be further based on an amount of resources consumed during particular deviations and/or non-physical constraints such as required delivery timeliness parameters.

Figure 3:
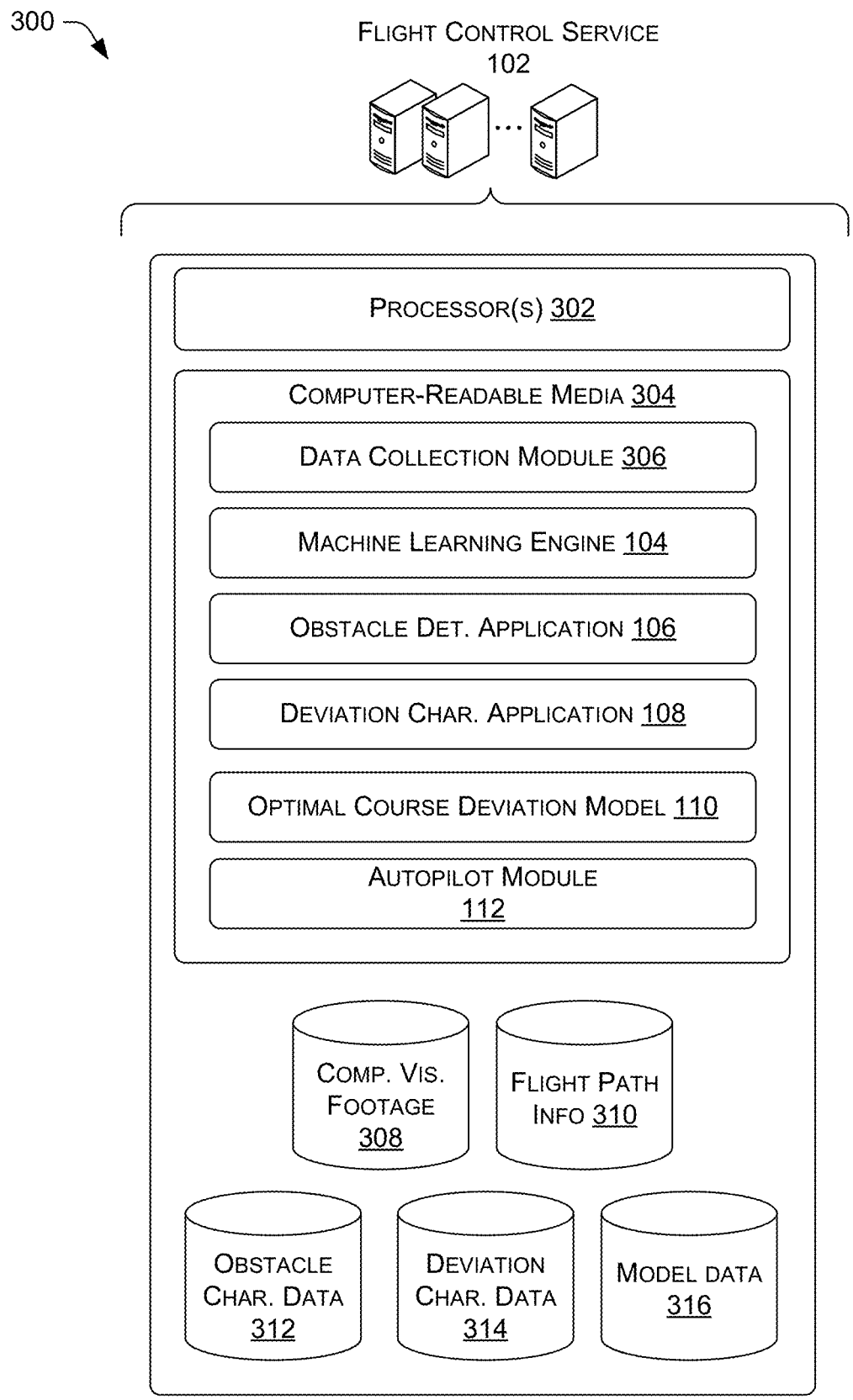
FIG. 3 is a block diagram of an illustrative computing architecture to perform autonomous UAV obstacle avoidance using machine learning from remotely piloted UAV flights.

FIG. 3 is a block diagram of an illustrative computing architecture 300 to perform autonomous Unmanned Aerial Vehicle (UAV) obstacle avoidance using machine learning from piloted UAV flights. The computing architecture 300 may be implemented in a distributed or non-distributed computing environment.

The computing architecture 300 may include one or more processors 302 and one or more computer readable media 304 that stores various modules, applications, programs, or other data. The computer-readable media 304 may include instructions that, when executed by the one or more processors 302, cause the processors to perform the operations described herein for the flight control service 102.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

In some embodiments, the computer-readable media 304 may store a data collection module 306, the machine learning engine 104, the obstacle detection application 106, the deviation characteristics application 108, the optimal deviation model 110, and the autopilot module 112, which are described in turn. The components may be stored together or in a distributed arrangement. The flight control service 102 may also store or have access to recorded computer vision footage 308 and/or flight path information 310 for use in generating obstacle characteristics data 312, deviation characteristics data 314, model data 316, or any combination thereof. Any of the foregoing may be stored locally and/or remotely.

The data collection module 206 may collect the computer vision footage 308 and flight path information 310 from one or more piloted UAVs. For example, the piloted UAVs may transmit the computer vision footage 308 to the flight control service 102 as a substantially live data stream for pilots to visually monitor while controlling the UAVs. The piloted UAVs may further collect flight path information 310 while in flight. For example, the piloted UAVs may periodically collect geo-coordinate information as described in relation to FIG. 2B. The geo-coordinate information may include GPS coordinate data as well additional data associated with individual coordinates such as, for example, velocity data, acceleration data, rotational acceleration data, time-stamps, on-board resources data, air temperature data, barometric pressure data, or any combination thereof. The flight path information 310 may be transmitted to the flight control service 102 in real time or may be stored onboard for a subsequent download by the flight control service 102.

The obstacle detection application 106 may analyze the computer vision footage 308 corresponding to the piloted UAV flights to identify obstacles and also to generate the obstacle characteristics data by determining notable characteristics of the obstacles. Exemplary characteristics appropriate for inclusion in the obstacle characteristics data include, but are not limited:

General Movement: In some instances, the obstacle detection application 106 may generate general movement characteristic data associated with various obstacles. Observed movements of an object may be indicative of likely future movements of the object. For example, a UAV that is flying along a highly erratic flight path may be more likely to make unpredictable movements in the future, e.g. as an autonomous UAV is passing by the first UAV, than a different obstacle that is maintaining straight and level flight. Moreover, an object that is currently moving at a slow velocity may be more likely to travel slowly in the future than a different object that is currently moving at a fast velocity.

Relative Movement: In some instances, the obstacle detection application 106 may generate relative movement characteristic data associated with various obstacles. For purposes of maintaining adequate separation from an obstacle, a noteworthy characteristic may be the relative movement of the obstacle to a UAV. For example, very different course deviations may be necessary in response to an obstacle traveling away from the UAV as opposed to if the obstacle were converging head on with the UAV.

Proximity: In some instances, the obstacle detection application 106 may generate proximity characteristic data associated with various obstacles. For purposes of maintaining adequate separation from an obstacle, a noteworthy characteristic may be the distance between the obstacle and the UAV. For example, very different course deviations may be necessary in response to an obstacle converging head on with the UAV from several miles away as opposed to if the obstacle were converging head on with the UAV from several hundred feet away.

Shape: In some instances, the obstacle detection application 106 may generate shape characteristics data associated with various obstacles. Observed shapes of objects may be indicative of likely future movements of the objects. For example, very large objects such as commercial airliners may be more likely to maintain a current course/trajectory than smaller objects such as single engine aircraft or small recreational UAVs.

Brightness: In some instances, the obstacle detection application 106 may generate luminous intensity characteristics data associated with various obstacles. For example, stereo vision capabilities of a UAV may be disrupted or may be caused to falsely identify obstacles due to very bright sources of light entering the camera units. Such a situation may be an occurrence of lens flaring in cameras that are facing the sun.

Equipment: In some instances, the obstacle detection application 106 may observe equipment and/or cargo data associated with various obstacles. Observed equipment and/or cargo may be indicative that an obstacle is not likely to make erratic flight maneuvers. For example, each of a delivery UAV and a news organization UAV with a large camera mounted and hovering over a roadway are examples of UAVs which may be operating under specific objectives such that erratic behavior is unlikely.

Operating Agency: In some instances, the obstacle detection application 106 may identify an operating agency associated with various obstacles. Obstacles associated with certain agencies may have certain observable patterns of behavior. For example, an urban seaplane airline may operate within particular traffic patterns while shuttling passengers between locations.

Accordingly, markings or other visual cues for identifying an obstacle as having any of the above characteristics may be a notable and worthy of inclusion in the obstacle characteristic data 312. Of course, other types of notable characteristics of the obstacles may also be recognized by the obstacle detection application 106 and/or included in the obstacle characteristic data 312 and are within the scope of the present disclosure.

The deviation characteristic application 108 may analyze the flight path information 310 corresponding to the piloted UAV flights to identify manual course deviations and to generate the deviation characteristics data 314 corresponding to the manual course deviations. Exemplary characteristics appropriate for inclusion in the deviation characteristics data 314 include, but are not limited:

Deviation type: In some instances, the deviation characteristic application 108 may determine the type of various deviations. For example, in order to alter a course a pilot may perform various types of control maneuvers such as, for example, turning left or right and/or climbing or descending to pass over or dip under an obstacle. Specific inputs may also be determined in association with specific maneuvers. For example, for a specific climb maneuver a corresponding climb rate and/or power increase may be determined.

Deviation Costs: In some instances, the deviation characteristic application 108 may determine the costs associated with various deviations. For example, to avoid a number of similar obstacles, a plurality of UAV flight paths may include a banking turn maneuver to fly around the obstacle while a different plurality of UAV flight paths may include a climb over the obstacle. Each of these maneuver types may be associated with costs. For example, the turn maneuver may moderately increase battery usage whereas the climb maneuver may severely drain the battery. Furthermore, the turn maneuver may severely increase flight time whereas the climb maneuver may be performed with little or no additional flight time.

UAV Configuration: In some instances, the deviation characteristic application 108 may determine characteristics associated with the UAVs' configuration while performing various deviations. For example, an amount of available thrust being used for straight and level flight may be indicative of a weight of a UAV. In particular, if a UAV it is determined that a UAV is using a majority of its thrust capacity simply to maintain current altitude then the UAV may be heavily loaded. Accordingly, a climb maneuver may be infeasible for inclusion in an optimal course deviation. Alternatively, a UAV that is using very little thrust to maintain altitude may be able to easily climb.

UAV Stability Effects: In some instances, the deviation characteristic application 108 may determine an impact on the UAVs' stability due to various course deviations. For example, it may be determined that lightly loaded or cargo-less UAVs may be able to perform abrupt or sharp turns without control inputs decreasing in effectiveness. In contrast, it may also be determined that heavily loaded UAVs may require more subtle control inputs to maintain stability.

Environmental Conditions: In some instances, the deviation characteristic application 108 may determine environmental conditions corresponding to various course deviations. Exemplary environmental conditions include, but are not limited to, temperature, barometric pressure, wind velocity, and wind gust velocity. Environmental conditions may be determined based on one or more UAV mounted sensors and/or by querying one or more resources for environmental data associated with the flight path during the flight, e.g. by querying one or more aviation weather services.

Of course, other types of notable characteristics of the manual course deviations may also be recognized by the deviation characteristics application 108 and/or included in the deviation characteristic data 314 and are within the scope of the present disclosure.

In some embodiments, the deviation characteristics data 314 may include characteristics of deviations performed during one or more autonomous UAV flights. For example, an autonomous UAV may perform an autonomous deviation that causes the UAV to enter a geographic region in which a connection with the flight control service 102 becomes intermittent or is lost entirely. Data associating these connection issues with the deviation and/or geographic region may be then recorded and stored in the deviation characteristic data. Additionally, the deviation characteristic data may include data to identify areas of known turbulence that are identified during previous autonomous UAV flights. Accordingly, in some embodiments, various data types described herein may be collected during autonomous UAV flights and processed by the machine learning engine to generate the optimal course deviation model 110.

The machine learning engine 104 may use the obstacle characteristic data 312 and the deviation characteristics data 314 as training data to create the optimal course deviation model 110 that is usable by the autopilot module 112 to avoid obstacles during autonomous UAV flights. In some embodiments, the machine learning engine 104 may perform analytics, including statistical analytics, to assist in functions performed by one or both of the obstacle detection application 106 or the deviation characteristics application 108 and also for formation and maintenance of the optimal deviation model 110. For example, the machine learning engine 104 may be deployed (i) to analyze the computer vision footage 308 to assist in identifying notable obstacle characteristics, (ii) to analyze the fight path information 310 to assist in identifying notable deviation characteristics, (iii) to process the training data to identify correlations between course deviations of a particular type and degree and obstacles of a particular type and degree. For example, abrupt deceleration maneuvers may strongly correlate with recreational UAVs entering the piloted UAV's FOV at a close proximity. Accordingly, the relative proximity of a recreational UAV may be an indicator that it is appropriate to decelerate from cruising speed until having passed by a zone associated with the recreational UAV. Furthermore, the relative proximity of the recreational UAV may be related to the amount of deceleration that is appropriate. For example, in instances when a recreational UAV is identified at a very close proximity to the piloted UAV 114 then the corresponding manual course deviations may include full stops or even course reversals to re-gain distance from the recreational UAV.

The optimal deviation model 110 may be a model that predicts or calculates an optimal course deviation in response to various indicators being identified. In some embodiments, many indicators may be included in a function associated with the optimal deviation model 110, such as hundreds or thousands of identifiers, as potential inputs to the function. The model may further include weights for the indicators. The indicators may be variables that are populated by information from, or derived from, any information described herein (e.g. 308, 310, 312, and/or 314). The optimal deviation model 110 may evolve over time, via updates, such as changes to indicators, changes to weights, and/or other changes. As discussed above, the machine learning engine 104 may determine correlations between the obstacle characteristic data 312 and the deviation characteristic data 314. Thus, the machine learning engine 104 may determine identifiers and/or weights for use in the optimal deviation model 110, which may be stored in the model data 214.

FIGS. 4-7 are flow diagrams of various illustrative processes in accordance with the present disclosure. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described blocks can be combined in any order and/or in parallel to implement the processes.

Figure 4:
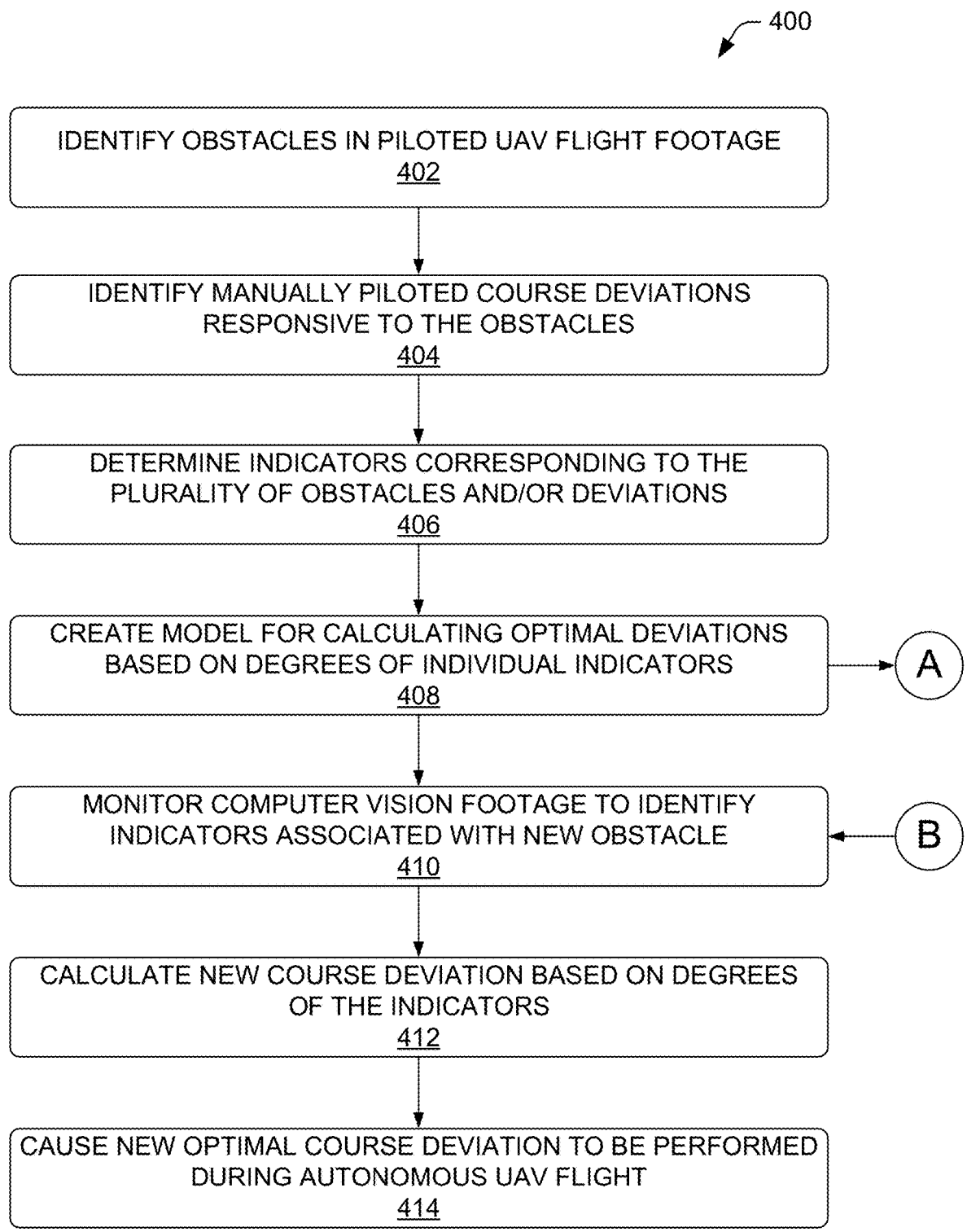
FIG. 4 is a flow diagram of an illustrative process to perform autonomous UAV obstacle avoidance using machine learning from remotely piloted UAV flights.

FIG. 4 is a flow diagram of an illustrative process to perform autonomous Unmanned Aerial Vehicle (UAV) obstacle avoidance using machine learning from piloted UAV flights. The process 400 is described with reference to FIGS. 1-3 and may be performed by the flight control service 102.

At 402, the obstacle detection application 106 may identify a plurality of obstacles 124 and 126 within video and/or the computer vision footage 308 corresponding to piloted UAV flights. For example, during a piloted UAV flight a pilot 118 may be viewing footage of a course 122 the UAV 114 is travelling on. The footage may be supplemented with computer vision technology to assist the pilot 118 in identifying the obstacles. In some embodiments, the computer vision technology may be configured to determine obstacle characteristic data and communicate the same to the pilot 118 via the UAV control terminal 116. For example, the computer vision may be used to determine the trajectory 128 and/or velocity of the hot air balloon 126, a distance between the piloted UAV 114 and the hot air balloon 126, and any other notable characteristics of the obstacle. Any characteristics which are discernable by the computer vision and relevant to the pilot's 118 decision making with regard to performing manual course deviations may be determined and stored as the obstacle characteristic data 312. The obstacle characteristic data 312 may be displayed on the UAV control terminal 116, e.g. text and or symbols may be super imposed over the video and/or computer vision footage corresponding to piloted UAV flights.

At 404, the deviation characteristics application 108 may identify manually piloted course deviations performed during the piloted UAV flights in response to the plurality of obstacles 124 and 126. In some embodiments, the deviation characteristics application 108 may analyze the flight path information 310 corresponding to those portions of the piloted UAV flights during which the obstacles have been identified. For example, the hot air balloon 126 may be viewable within the footage from T=10 minutes until T=15 minutes within the video footage. The pilots' 118 response to the hot air balloon 126 may begin at T=10 minutes and may extend beyond T=15 minutes, e.g. although outside the FOV after this time the pilot 118 still has knowledge of its presence. Accordingly, the deviation characteristics application 108 may associate a range of time from T=10 to T=15 (or later) with the hot air balloon 126 (and other obstacles if appropriate) and analyze flight path information corresponding these portions of the piloted UAV flights to identify notable characteristics associated with manually performed course deviations for storage as the deviation characteristics data 314.

At 406, the machine learning engine 104 may determine indicators, corresponding to the obstacles, which correlate with one or more of the manually performed course deviations. For example, the trajectory 128 being upwardly directed toward the course 122 may be an indicator that correlates with pilots deciding to descend from the course 122, e.g. to dip under the trajectory 128 along course deviation 130. Moreover, with reference to FIGS. 2A-2B, an erratic nature of an obstacle 208 may be a second indicator that correlates with pilots deciding to give a degree of separation from the obstacle that in commensurate to a degree of the erratic nature. For example, if the obstacle is highly erratic, e.g. flying very fast within a large obstacle zone 212, then pilots may tend to provide a very large amount of separation, e.g. one-quarter or one half mile.

At 408, the machine learning engine 104 may generate an optimal deviation model 110 that uses individual occurrences the indicators identified at 406 as inputs to calculate optimal course deviations based on specific degrees to which the individual indicators occur. For example, an indicator of a course deviation may be a distance between an obstacle and a piloted UAV such that a pilot may perform the course deviation at an increased degree as the obstacle is identified at a closer range. Thus, an obstacle 126 that is identified as converging onto the course 122 at a distance of several miles from the UAV 114 may trigger a more subtle course deviation than if the convergence were to occur in a few hundred feet. In some embodiments, one or more indicators not be directly related to the obstacles. For example, a weight of the UAV 114 and a current air density may each be indicators as to whether a climb type course deviation can or should be performed. In particular, a heavy UAV in thin air may be unable to climb or a climb may drain the battery too severely as compare to a turn or descend type maneuver.

At 410, a substantially live stream of computer vision footage may be monitored during an autonomous UAV flight to identify new occurrences of the indicators in associated with new obstacles, e.g. obstacles 204' and 208'. For example, an autonomous UAV 132 may be configured with the autopilot module 112 which may monitor computer vision footage taken by the autonomous UAV 132 to identify new obstacles and indicators associated with the new obstacles. In some embodiments, the autopilot module 112 may be configured to identify a corresponding degree of the individual indicators. For example, the autopilot module 112 may determine a distance between the UAV and the obstacle, a velocity of the obstacle, a level of erraticness of the obstacles current or probable future behavior, or any other indicator that may be represented in terms scalar terms.

At 412, a new optimal course deviation may be calculated based on corresponding degrees of the new individual indicators identified at block 410. For example, based on an obstacle that enters the autonomous UAV's 132 FOV at a distance of 300 feet from the UAV 132 an optimal course deviation may include a sharp 45 degree bank away from the obstacle whereas if the obstacle were identified at 1500 feet from the UAV the optimal course deviation may include a relatively slighter 20 degree bank away from the obstacle. In some embodiments, an increase or decrease in a degree of an indicator may result in the optimal course deviation including a different type of maneuver altogether, e.g. not just a varying degree of a maneuver. For example, a decrease in air density and/or an increase in UAV cargo weight may result in climbs being avoided altogether based on performance or energy consumption effects.

At 414, the autopilot module 112 may cause the new optimal course deviation to be performed by the autonomous UAV 132 to avoid the new obstacles during the autonomous UAV flight.

Figure 5:
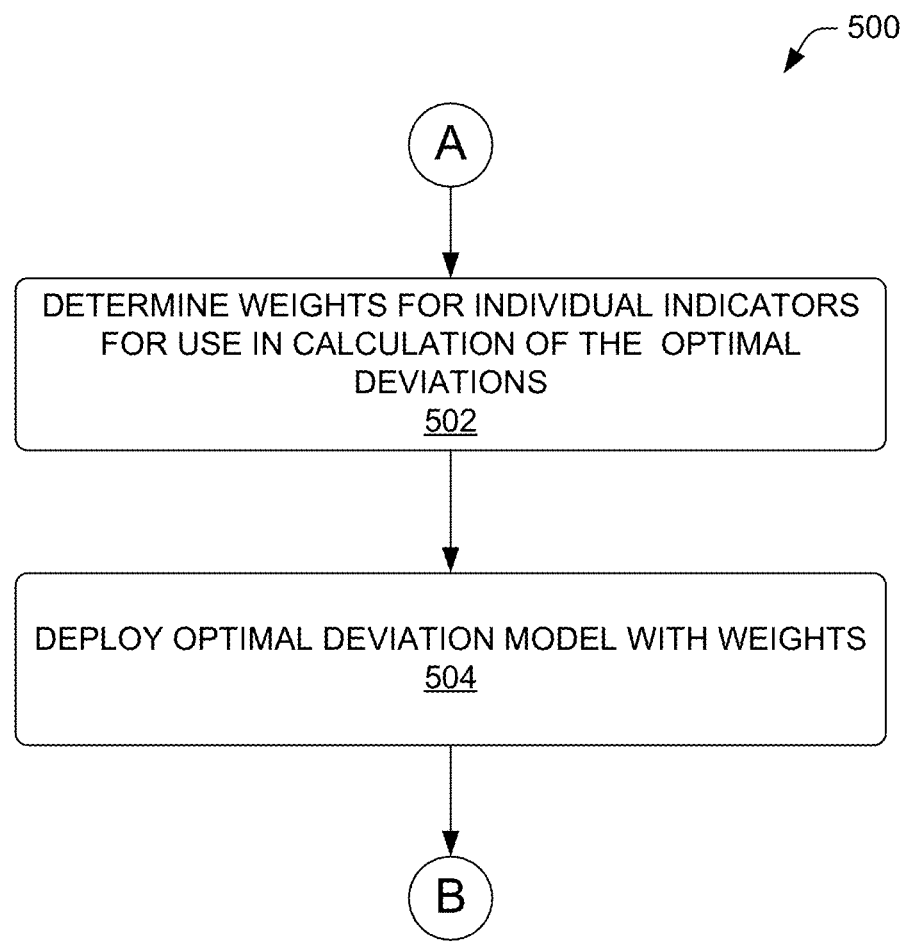
FIG. 5 is a flow diagram of an illustrative process to determine resource-expenditures associated with various maneuver types under various configurations to select a maneuver type during an autonomous UAV flight based on currently available resources.

FIG. 5 is a flow diagram of an illustrative process 500 to perform autonomous Unmanned Aerial Vehicle (UAV) obstacle avoidance using an optimal deviation model with various weighting factors for various contextual indicators. The process 500 is described with reference to FIGS. 1-3 and may be performed by the flight control service 102 in conjunction with one or more operations from process 400.

At 502, which may be performed in conjunction with the operation described at block 408, the machine learning engine 104 may determine weights for individual indicators that apportion the influence of the indicators in calculation of the optimal course deviations. The weights may be included in the optimal deviation model 110 as part of the function. For example, the weights may be created to reflect the strength of the correlation of indicators. For example, an obstacle being identified within the center region of the autonomous UAVs 132 field of view may be a strong indicator of a course deviations that deserves a relatively heavy weight whereas an obstacle being identified in the peripheral areas of the field of view may be weaker and deserving of relatively less weight. Moreover, an obstacle with a relative motion that is converging on the UAV 132 (e.g. flying toward the UAV 132) may be a strong indicator of a course deviations that deserves a relatively heavy weight whereas an obstacle a relative motion that is diverging from the UAV 132 (e.g. flying away the UAV 132) may be weaker and deserving of relatively less weight. Some functions or models may not use weights whatsoever, e.g. influence of indicators may be un-apportioned.

At 504, the autopilot module 112 may deploy the optimal deviation model with the determined weights during an autonomous UAV flight. For example, the autopilot module 112 may perform one or more operations described in relation to blocks 410, 412, and/or 414 during the autonomous UAV flight. Due to the potentially varying correlative strengths of the newly identified indicators, the deployed function may discount (or mark-up) the importance of certain observed indicators over other observed indicators.

Figure 6:
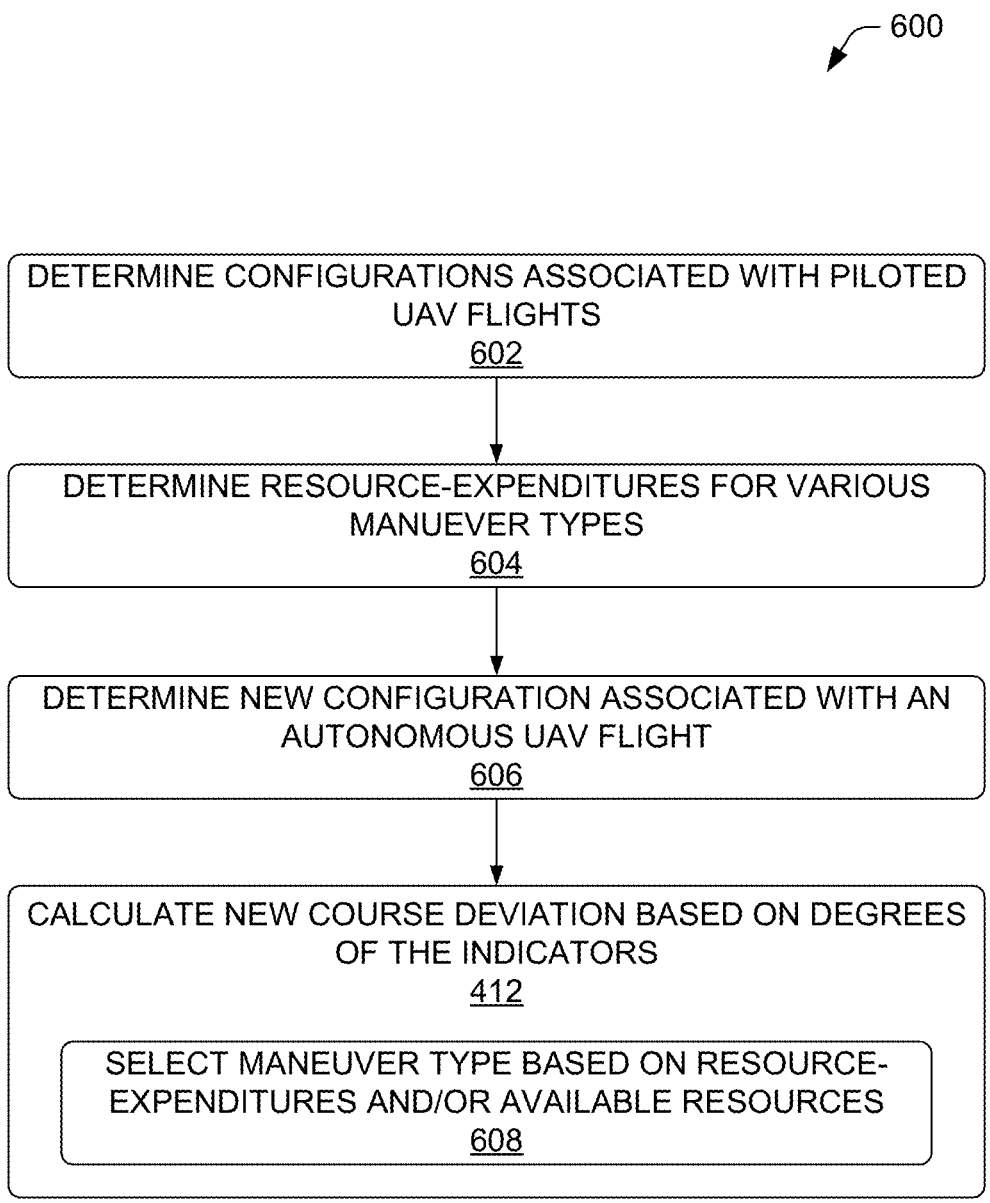
FIG. 6 is a flow diagram of an illustrative process to determine resource-expenditures associated with various maneuver types under various configurations to select a maneuver type during an autonomous UAV flight based on currently available resources.

FIG. 6 is a flow diagram of an illustrative process 600 to determine resource-expenditures associated with various maneuver types under various configurations to select a maneuver type during an autonomous UAV flight based on currently available resources. The process 600 is described with reference to FIGS. 1-3 and may be performed by the flight control service 102.

At block 602, the flight service controller 102 may determine configurations for the plurality of piloted UAV flights. For example, the flight service controller 102 may determine total weights of the piloted UAVs (e.g. due to cargo loads), equipment configured onto the UAVs (e.g. high performance batteries capable of high power output and/or increased endurance), and any other type of configuration characteristics associated with the piloted UAVs.

At block 604, the flight service controller 102 may determine resource-expenditures for various maneuver types performed during the piloted UAV flights. For example, the it may be determined that a number of climbing flight maneuvers consumed on average a certain amount of energy per unit of altitude gain and also a number of turning flight maneuvers to alter course around an obstacle consumed a certain amount of energy per unit of increased flight time and/or travel distance. In some embodiments, the determined resource-expenditures may be associated with the configurations determined at block 502. For example, the flight service controller 102 may determine a relationship between energy consumption per unit of altitude gain and variations in the UAV cargo load.

At block 606, the flight service controller 102 may determine a configuration associated with an autonomous UAV 132. In some embodiments, configuration data may be transmitted to the flight service controller 102 from an external source. For example, a merchant using the autonomous UAV to ship consumer goods to the destination 120 may provide order details such as weight and/or cargo box shape to the flight service controller 102. In some embodiments, the configurations of the autonomous UAV 132 may be independently determined or estimated by the flight service controller 102. For example, the flight service controller 102 may determine a configuration such as a weight of the autonomous UAV 132 based on a current performance of the UAV 132. As a more specific example, acceleration data may be collected via an onboard accelerometer of the autonomous UAV 132 simultaneously with controlled amounts of thrust being applied by rotors of the UAV 132. Accordingly, a precise amount of thrust and the resulting acceleration may be used to calculate the weight of the UAV 132, e.g. if precisely 12 kg of vertical thrust is applied and the vertical component of acceleration is determined to be null then UAV weight can be calculated as 12 kg.

At block 608, which may be included in the calculation of the new optimal course deviation at block 412, a maneuver type and/or corresponding degree thereof may be selected to be included in the new optimal course deviation. In some embodiments, the maneuver type and/or degree thereof may be selected based on available resources of the autonomous UAV. For example, if either one of flying around or climbing over may be used to provide separation from an obstacle, it may be determined that previous flying around course deviations under similar configurations to the autonomous UAV 132 used significantly less energy than climbing over. It may also be determined that flying around cost significant additional time whereas climbing over has little or no time impact. Accordingly, the new optimal course deviation may be selected based on currently available resources such that if the UAV 132 has sufficient battery life left and is under delivery time constraints the climb over maneuver may be preferred and selected over flying around the obstacle.

Figure 7:
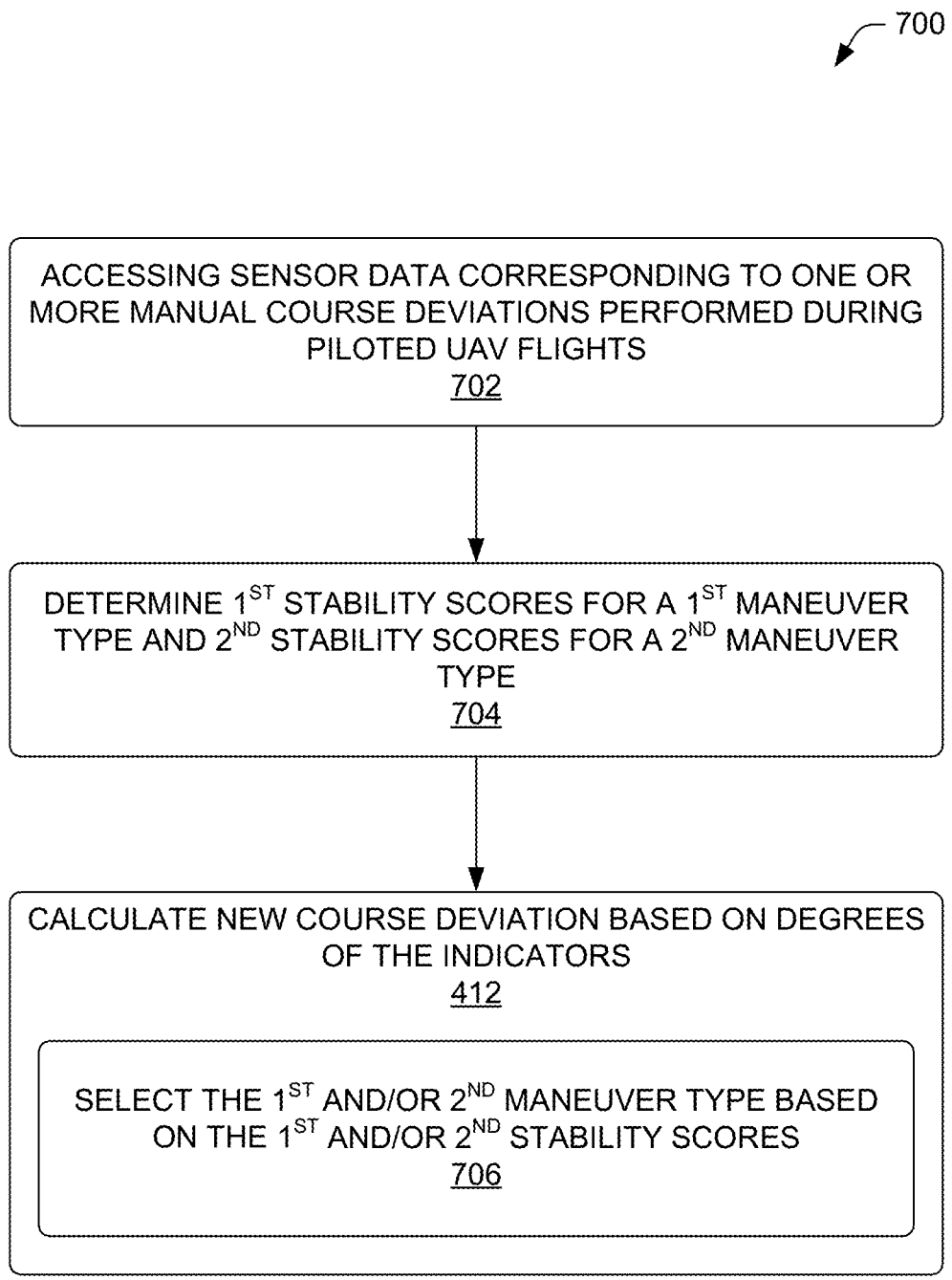
FIG. 7 is a flow diagram of an illustrative process of accessing sensor data corresponding to various maneuver types and scoring the maneuver types in terms of UAV stability.

FIG. 7 is a flow diagram of an illustrative process of accessing sensor data corresponding to various maneuver types and scoring the maneuver types in terms of UAV stability. The process 700 is described with reference to FIGS. 1-3 and may be performed by the flight control service 102.

At block 702, the flight control service 102 may access sensor data corresponding to manual course deviations performed during the piloted UAV flights. For example, the piloted UAVs 114 may include one or more on-board sensors (e.g. accelerometers and/or gyroscopes) for taking continuous and/or periodic measurements during the piloted UAV flights.

At block 704, the flight control service 102 may determine one or more types of maneuvers that were performed to accomplish the manual course deviations performed during the piloted UAV flights and, for individual types of maneuvers, stability scores representative of a degree to which the piloted UAVs remained stable during such maneuvers. For example, the flight control service 102 may score first and second maneuver types based on various factors associated with flight stability such as, for example, an ability of the UAVs to control altitude during the maneuvers and/or a responsiveness of the UAVs to control inputs during the maneuvers. In some embodiments, the stability scores may be based on a degree to which the UAV pitch and/or attitude oscillates in response to attempts to manually perform a flight maneuver.

At block 706, which may be included in the calculation of the new optimal course deviation at block 412, the flight control service 102 and/or autopilot module 112 may select between the various maneuver types for inclusion in an optimal course deviation. For example, the flight control service 102 and/or autopilot module 112 may recognize a heavily weighted configuration of a UAV which may be indicative that neither of a climb maneuver nor a sharp turn maneuver may be performed without a corresponding stability score falling below a threshold level. Accordingly, a gradual turn maneuver and/or a descending maneuver may be selected in lieu of the foregoing. Once selected, the flight control service 102 and/or autopilot module 112 may determine a degree of the selected maneuver for inclusion in the optimal deviation. For example, a rate at which to turn or descend may be determined.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
   one or more processors; and
   memory storing computer-executable instructions that, when executed, cause the one or more processors to perform acts comprising:
   identifying, based at least in part on first data corresponding to a flight vehicle flight associated with a first vehicle, one or more indicators associated with one or more first items to be avoided;
   creating, based at least in part on one or more course deviations, an optimal deviation model to calculate one or more optimal course deviations during a second vehicle flight of a second vehicle; and
   deploying the optimal deviation model during the second vehicle flight of the second vehicle, wherein deploying the optimal deviation model comprises:
   monitoring second flight data corresponding to the second vehicle flight to identify one or more new occurrences of the one or more indicators in association with a second item to be avoided, the second item being absent from the one or more first items;
   calculating, based at least in part on the one or more new occurrences of the one or more indicators, an optimal course deviation for avoidance of the second item; and
   causing the optimal course deviation to be performed during the second vehicle flight.

2. The system as recited in claim 1, wherein the acts further comprise:
   calculating one or more initial occurrences of the one or more indicators; and
   calculating the one or more course deviations based at least in part on the one or more initial occurrences of the one or more indicators,
   wherein deploying the optimal deviation model further comprises:
   determining that the second item has a higher speed or a higher level of unpredictability than at least one third item to be avoided; and
   determining a larger deviation for avoidance of the second item than for avoidance of the at least one third item, the optimal course deviation including the larger deviation for avoidance of the second item, based at least in part on the one or more initial occurrences.

3. The system as recited in claim 1, wherein the one or more indicators include environment condition indicators, the environment condition indicators including at least one of temperature indicators, barometric pressure indicators, or air density indicators.

4. The system as recited in claim 1, wherein the optimal deviation model applies one or more weights to the one or more indicators in calculation of the optimal course deviation.

5. The system as recited in claim 1, wherein the acts further comprise receiving computer vision data captured by the first vehicle to determine obstacle characteristic data associated with the first vehicle, the computer vision data being received as a live data stream usable by the first vehicle to control the first vehicle.

6. The system as recited in claim 1, wherein the optimal course deviation includes an angular deviation from a portion of a course of the second vehicle, the angular deviation being inversely related to a distance between the second item and the second vehicle.

7. A method comprising:
   identifying, based at least in part on first data associated with a first vehicle flight of a first vehicle, one or more indicators associated with one or more first items to be avoided;
   determining, based at least in part on one or more course deviations, an optimal deviation model to calculate one or more optimal course deviations during a second vehicle flight of a second vehicle; and
   deploying the optimal deviation model during the second vehicle flight, wherein deploying the optimal deviation model comprises:
   monitoring second flight data associated with the second vehicle flight to identify one or more new occurrences of the one or more indicators in association with a second item to be avoided;

determining, based at least in part on the one or more new occurrences of the one or more indicators, an optimal course deviation for avoidance of the second item to be avoided; and causing the second vehicle to perform the optimal course deviation during the second vehicle flight.

8. The method as recited in claim 7, further comprising:
calculating degrees of initial occurrences of the one or more indicators associated with the one or more first items; and
calculating the one or more course deviations based at least in part on the degrees of the initial occurrences.

9. The method as recited in claim 7, further comprising:
calculating degrees of initial occurrences of the one or more indicators associated with the one or more first items,
wherein deploying the optimal deviation model further comprises:
determining that the second item has a higher speed or a higher level of unpredictability than at least one third item to be avoided; and
determining a larger deviation for avoidance of the second item than for avoidance of the at least one third item, the optimal course deviation including the larger deviation for avoidance of the second item, based at least in part on the degrees of the initial occurrences.

10. The method as recited in claim 7, wherein the optimal deviation model applies one or more weights to the one or more indicators in calculation of the optimal course deviation.

11. The method as recited in claim 7, further comprising receiving computer vision data captured by the first vehicle to determine obstacle characteristic data associated with the first vehicle, the computer vision data being received as a live data stream usable by the first vehicle to control the first vehicle.

12. The method as recited in claim 7, wherein the optimal course deviation includes an angular deviation from a portion of a course of the second vehicle, the angular deviation being inversely related to a distance between the second item and the second vehicle.

13. The method as recited in claim 7, further comprising:
determining resource-expenditures (REs) associated with maneuver types; and
comparing available resources, associated with the second vehicle flight, to at least one RE of the REs to select at least one maneuver type of the maneuver types to be included in the optimal course deviation.

14. The method as recited in claim 7, further comprising:
receiving, from the first vehicle, recorded flight data;
determining, based at least in part on the recorded flight data, cargo configurations corresponding to the first vehicle flight during the one or more course deviations; and determining a new cargo configuration associated with the second vehicle, the optimal course deviation being based at least in part on the new cargo configuration.

15. The method of claim 7, wherein the optimal course deviation includes a horizontal course alteration and at least one of a velocity alteration or an altitude alteration.

16. The method as recited in claim 7, wherein determining the optimal course deviation for avoidance of the second item is further based at least in part on a current level of on-board energy resources.

17. A system resource comprising:
one or more processors; and
memory storing computer-executable instructions that, when executed, cause the one or more processors to perform acts comprising:
identifying, based at least in part on first data associated with a first vehicle flight of a first vehicle, one or more indicators associated with one or more first items to be avoided;
generating, based at least in part on one or more course deviations, an optimal deviation model to calculate one or more optimal course deviations during a second vehicle flight of a second vehicle; and
deploying the optimal deviation model during the second vehicle flight of the second vehicle by performing operations of:
monitoring second flight data associated with the second vehicle flight to identify one or more new occurrences of the one or more indicators in association with a second item; and
causing, based at least in part on the one or more new occurrences of the one or more indicators, the second vehicle to perform an optimal course deviation during the second vehicle flight.

18. The system resource as recited in claim 17, wherein generating the optimal deviation model further comprises:
calculating degrees of initial occurrences of the one or more indicators;
calculating the one or more course deviations based at least in part on the degrees of the initial occurrences of the one or more indicators; and
generating, based at least in part on the one or more course deviations, the optimal deviation model.

19. The system resource as recited in claim 17, wherein:
the one or more indicators include an obstacle erraticness indicator, and
the optimal course deviation provides a separation between the second vehicle and the second item that is based at least in part on the obstacle erraticness indicator.

20. The system resource as recited in claim 17, wherein the one or more indicators include at least some environment condition indicators, the environment condition indicators including at least one of temperature indicators, barometric pressure indicators, or air density indicators.

* * * * *